(12) United States Patent
Young (10) Patent No.: US 8,452,773 B1
(45) Date of Patent: May 28, 2013

(54) MAPPING TERMS BETWEEN MULTIPLE TAXONOMIES

(75) Inventor: Adam E. Young, Worcester, MA (US)

(73) Assignee: EMC Corporations, Hopkinton, MA (US)

( * ) Notice: Subject to any disclaimer, the term of this patent is extended or adjusted under 35 U.S.C. 154(b) by 13 days.

(21) Appl. No.: 13/198,812

(22) Filed: Aug. 5, 2011

(51) Int. Cl.
*G06F 17/30* (2006.01)

(52) U.S. Cl.
USPC .......................................................... 707/737

(58) Field of Classification Search
USPC ..................................... 707/2, 3, 737; 705/27
See application file for complete search history.

(56) References Cited

U.S. PATENT DOCUMENTS 7,912,823 B2 3/2011 Ferrari et al.
2008/0046343 A1* 2/2008 Maguire et al. ................. 705/27

* cited by examiner

*Primary Examiner* — Etienne Leroux
(74) *Attorney, Agent, or Firm* — BainwoodHuang (57) ABSTRACT

Improved techniques utilize a cross-referencing database which correlates terms which describe product information across multiple taxonomies. The cross-referencing database is independent of the taxonomies used to organize the product information in different departments and is thus able to correlate terms across multiple taxonomies. As a consequence, a user looking at product information in one taxonomy (e.g., a marketing department) can locate precisely where that product information resides in another taxonomy (e.g., the support department) despite the fact that the two taxonomies may refer to that same product using different terms and likely places those terms in different places.

22 Claims, 6 Drawing Sheets

| | Tag ID 30 | Term ID 32 | Term Name 34 | Taxonomy Name 36 | Other Attributes 38 |
|---|---|---|---|---|---|
| 28(a) | 60 | 11 | Clariion™ | Support | Family |
| 28(b) | 46 | 11 | Clariion™ | Marketing | Family |
| 28(c) | 64 | 12 | Symmetrix™ | Support | Family |
| 28(d) | 48 | 12 | Symmetrix™ | Marketing | Family |
| 28(e) | 50 | 13 | Symmetrix™ DMX™ Series | Marketing | Family |
| 28(f) | 52 | 14 | Symmetrix™ DMX™ 100 | Marketing | Product |

MAPPING TERMS BETWEEN MULTIPLE TAXONOMIES

BACKGROUND

Large companies which manufacture and sell products are typically composed of different departments. Each department may take on different responsibilities with respect to the products and therefore has a different way of managing product information.

For example, suppose that a company which produces and sells computers has a marketing department which presents information concerning the computers to potential customers. Further suppose that marketing department organizes the information by product line and, for each product family within a product line, the information is further organized by specific models. Suppose further that, in addition to the marketing department, the company has a support department which presents information concerning components of the computers. Further suppose that the support department organizes the information by component type and, for each component type, a set of product versions which support the component. In this case, the marketing and support departments each maintain their respective product information within separate hierarchies.

Further, in a conventional presentation of information, because each department separately manages the product information, they can have their own way of referring to the same product information.

SUMMARY

Unfortunately, there are deficiencies associated with the conventional presentation of information as described above. In a large company, different departments within the company may have poor internal communication between themselves. As a consequence, there can be a lack of awareness between different departments with respect to how product information is referenced. In essence, the same product may have different names within the marketing and support departments. For example, a product named "A" within the marketing department may be called "A'" within the support department.

Thus, a user who relies on product information across multiple departments will have difficulty deducing where particular product information lies within one department from where the particular product information lies within another department. Such a user may rely on a burdensome process of obtaining simultaneous product information from the multiple departments and comparing the different names to verify that the same product is being described. Such a process has the potential to provide the user with inaccurate information.

In contrast to the conventional presentation of information in which different departments refer to the same information in different ways, improved techniques utilize a cross-referencing database which correlates terms which describe product information across multiple taxonomies. The cross-referencing database is independent of the taxonomies used to organize the product information in different departments and is thus able to correlate terms across multiple taxonomies. As a consequence, a user looking at product information in one taxonomy (e.g., a marketing department) can locate precisely where that product information resides in another taxonomy (e.g., the support department) despite the fact that the two taxonomies may refer to that same product using different terms and likely places those terms in different places.

As an example, suppose that a product is identified with the term "A" in Taxonomy 1 and that the same product is identified with the term "A'" in Taxonomy 2. Within the cross-referencing database, these terms would both have a common term identifier, say, "10." Further, each of Taxonomy 1 and Taxonomy 2 has unique tag identifiers which denote a hierarchal position of a term with respect to other terms within the taxonomy. Thus, by knowing a unique tag identifier of "A" within Taxonomy 1 and specifying a desire to find the term in Taxonomy 2, the improved techniques will locate the common term identifier "10" corresponding to the term "A" within Taxonomy 1 and then determine that the term corresponding to the common term identifier "10" for Taxonomy 2 is "A'." The term "A'" is then located within Taxonomy 2 by its unique tag identifier.

One embodiment of the improved technique is directed to a method of cross-referencing terms across multiple taxonomies. The method includes receiving a lookup command having (i) a first tag identifier which identifies a particular term with respect to a first taxonomy and (ii) a taxonomy identifier which identifies a second taxonomy. The method also includes accessing, in response to the lookup command, a cross-referencing database to obtain a second tag identifier which identifies the particular term with respect to the second taxonomy. The method further includes acquiring the value of the tag identifier of the another entry.

Additionally, some embodiments of the improved technique are directed to a system for cross-referencing terms across multiple taxonomies. The system includes a network interface coupled to a network, a memory and a processor coupled to the memory, the processor configured to carry the method of cross-referencing terms across multiple taxonomies.

Furthermore, some embodiments of the improved technique are directed to a computer program product having a non-transitory computer readable storage medium which stores code including a set of instructions to carry the method of cross-referencing terms across multiple taxonomies.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Improved techniques utilize a cross-referencing database which correlates terms which describe product information across multiple taxonomies. The cross-referencing database is independent of the taxonomies used to organize the product information in different departments and is thus able to correlate terms across multiple taxonomies. As a consequence, a user looking at product information in one taxonomy (e.g., a marketing department) can locate precisely where that product information resides in another taxonomy (e.g., the support department) despite the fact that the two taxonomies may refer to that same product using different terms and likely places those terms in different places.

Figure 1A:
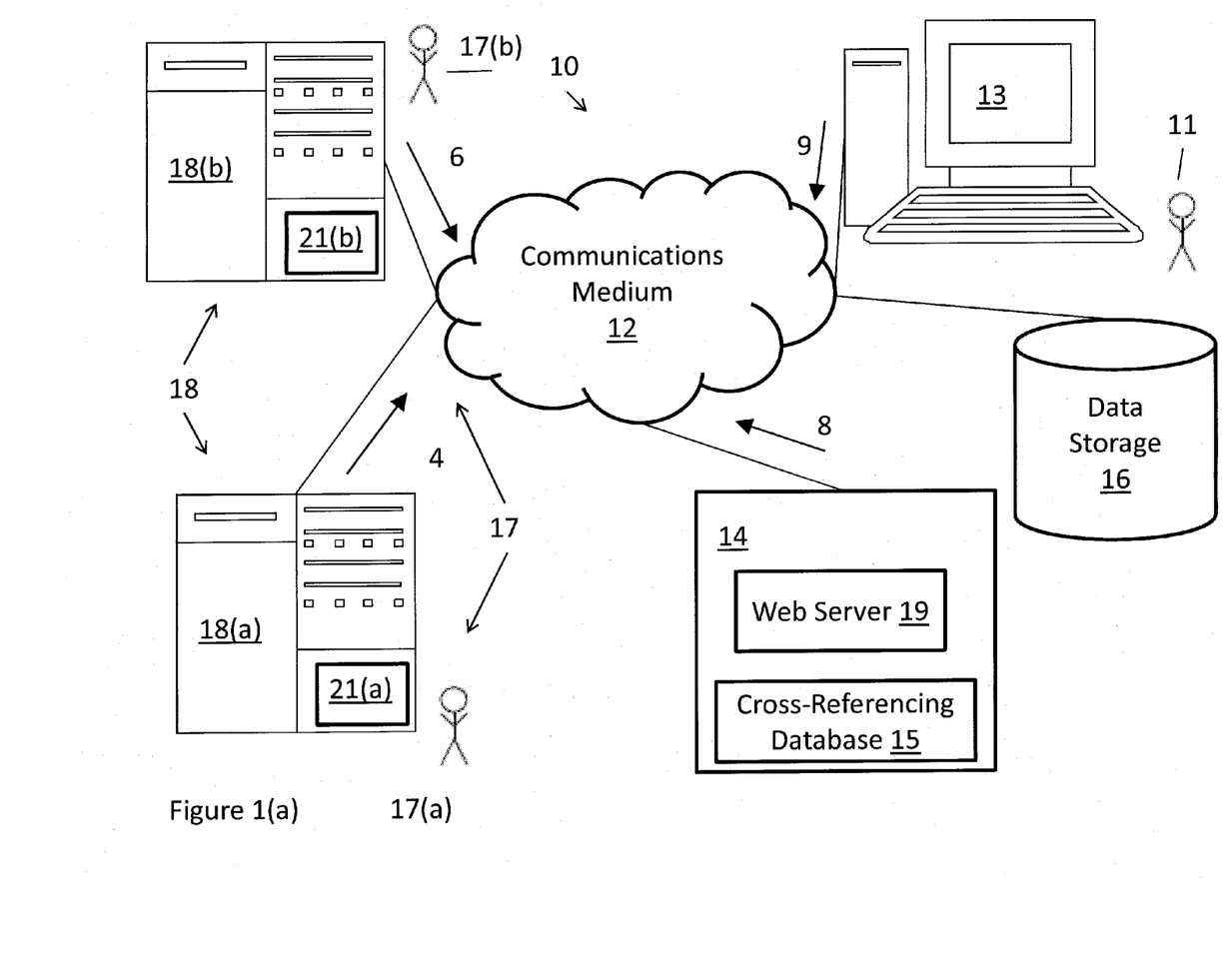
FIG. 1(a) is a schematic diagram illustrating an electronic environment for carrying out the improved technique.

FIG. 1(a) shows an electronic environment 10 which is suitable for use by the improved technique. Electronic environment 10 includes communications medium 12, remote computer 13, administration server 14, centralized data storage system 16 and departmental computers 18(a) and 18(b) (departmental computers 18).

Centralized data storage system 16 is constructed and arranged to provide storage of data which is accessible to departmental computers 18 and remote computer 13 over communications medium 12. For example, data storage system 16 provides a centralized repository of documents (e.g., white papers, knowledge-based articles, forum postings, etc.) pertaining to products which a company offers. In the electronic environment 10, the departmental computers 18 obtain data from the centralized data storage system 16.

Communication medium 12 provides connections between administration server 12, departmental computers 18 and remote computer 13. The communications medium 12 may implement a variety of protocols such as TCP/IP, UDP, ATM, Ethernet, Fibre Channel, combinations thereof, and the like. Furthermore, the communications medium 12 may include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

Administration server 14 stores term and taxonomy information in a cross-referencing database 15. Administration server 14 forms cross-referencing database 15 from terms and taxonomies created by users of the departmental computers 18. In some arrangements, administration server 14 includes a web server 19 for managing communications traffic and providing an interface to cross-referencing database 15. Further details of the contents of cross-referencing database will be discussed with reference to FIGS. 1(b) and 3 below.

Departmental computers 18 can take the form of a variety of devices such as a laptop, tablet, desktop, wireless device, etc. Departmental computers 18 are constructed and arranged to allow users 17(a) and 17(b) (users 17) to create terms, tags (links between terms and data stored on centralized data storage system 16 to which the terms refer) and taxonomies 21(a) and 21(b), respectively (taxonomies 21), that is, relationships between terms. In some arrangements, a term is a text string which describes a subset of the data.

Figure 1B:
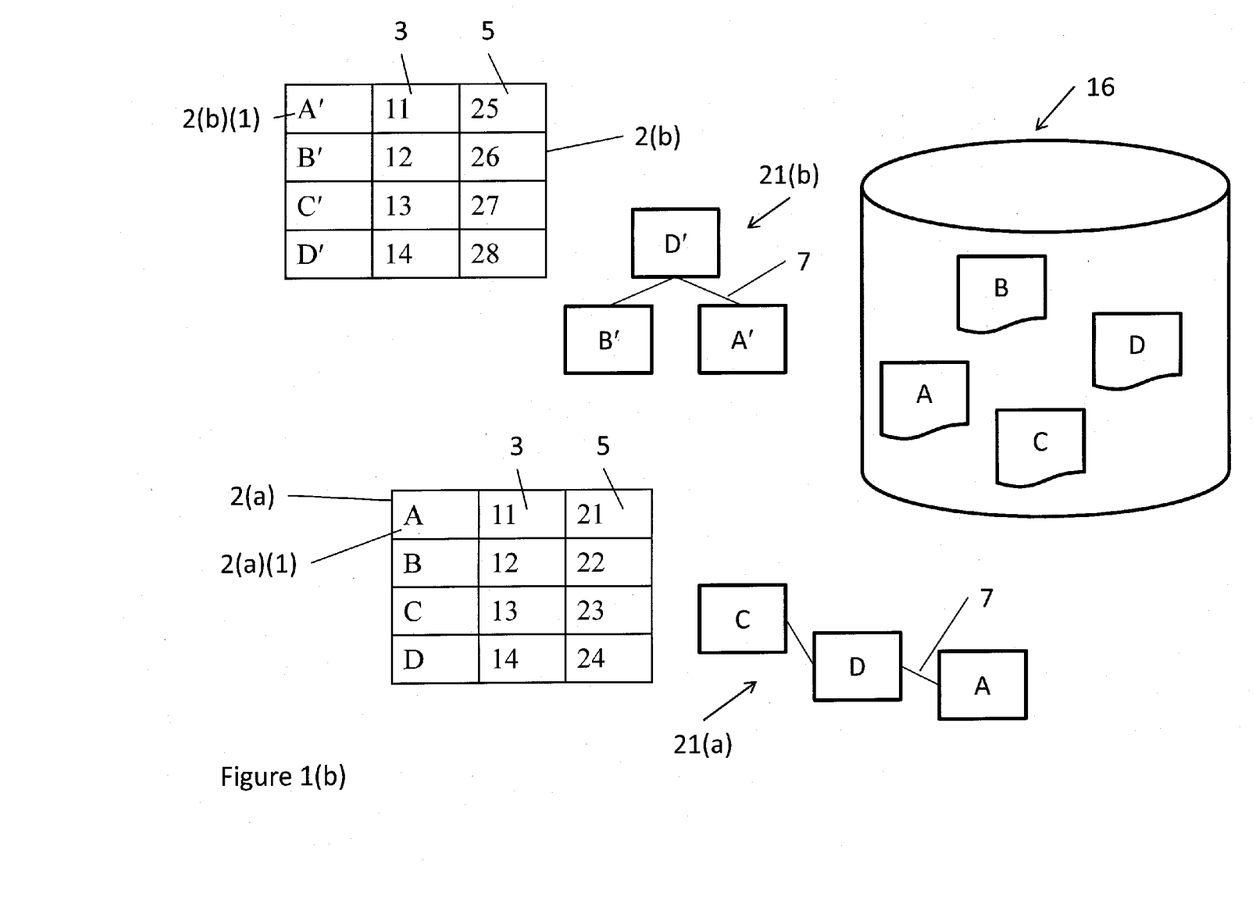
FIG. 1(b) is a schematic diagram of some taxonomies which are supported within the electronic environment illustrated in FIG. 1(a).

FIG. 1(b) shows examples of taxonomies 21(a) and 21(b) and their respective relationship to the data in the form of four documents A, B, C and D stored on centralized data storage system 16. In this case, the data are represented in taxonomy 21(a) by terms A, B, C and D, while the data are represented in taxonomy 21(b) by terms A', B', C' and D'. In each taxonomy 21, the terms are listed in taxonomy tables 2(a) and 2(b) representing the respective taxonomies 21(a) and 21(b). Each element of the taxonomy table 2 contains entries 2(a)(1), 2(b)(1), etc., each of which includes a term and two numerical identifiers. A first numerical identifier, a term identifier 3, identifies the term itself while a second numerical identifier, a tag identifier 5, identifies the hierarchal relationship 7 that term has with other terms within the taxonomy Referring back to FIG. 1(a), each user 17(a) and 17(b) sends their respective taxonomy table 2(a) and 2(b) via messages 4 and 6 from departmental computers 18(a) and 18(b) to administration server 14. From messages 4 and 6, administration server 14 generates cross-referencing database 15 which integrates the term and taxonomy information contained in messages 4 and 6. A result of this integration is to allow a user such as remote computer user 11 to be able to obtain information about a product's relationship to other products in the support organization while the user is examining information about the product within the marketing organization.

Remote computer 13 can take the form of a variety of devices such as a laptop, tablet, desktop, wireless device, etc. Remote computer 13 supports a remote computer user 11 who sends queries concerning the data to administration server 14.

During operation, remote computer user 11 sends, via remote computer 13, a message 9 to administration server 14, which message 9 contains a request to perform a lookup operation having a first tag identifier which identifies a particular term with respect to a first taxonomy and a taxonomy identifier which identifies a second taxonomy. Administration server 14, after receipt of the message 9, carries out the lookup operation and, as a result of the operation, identifies an entry in cross-referencing database 15 which includes the first tag identifier. From this entry, administration server 14 finds the unique value of the term identifier corresponding to the particular term. Administration server 14 then finds, out of all the entries which has a value of the term identifier equal to the unique value corresponding to the particular term, the particular entry which has a value of its taxonomy identifier equal to the taxonomy identifier specified in the message 9. Administration server 14 identifies the term with respect to the second taxonomy by outputting the value of the tag identifier found in the particular entry.

Consider again the example in FIG. 1(b). Within the cross-referencing database 15, the terms "A" and "A'" both have a common term identifier "11." Further, to each of these terms corresponds unique tag identifiers in each of taxonomy 21(a) and 21(b) which denote a hierarchal position of the terms with respect to other terms within their respective taxonomies. Thus, by knowing that the unique tag identifier of "A" within taxonomy 21(a) is "21" and specifying a desire to find the corresponding term in Taxonomy 2, the improved techniques will locate, from the tag identifier "21," the common term identifier "11" corresponding to the term "A" within taxonomy 21(a) and then determine that the term corresponding to the common term identifier "11" for taxonomy 21(b) is "A'." The term "A'" is then located within taxonomy 21(b) by its unique tag identifier "24."

An advantage of the improved technique lies in the integration of the taxonomies in the cross-referencing database 15. As an example, suppose that remote computer user 11 wishes to learn about a product in terms of the overall functionality of the product. In this case, remote computer user 11 searches for a product within the marketing organization and provides a list of products grouped by capacity, scalability and price. Because of the integration of the information in messages 4 and 6 within cross-referencing database 15, remote computer user 11 is able to locate, as in the example described above, the term for the product within the support taxonomy which has the products listed by component.

It should be understood that users 17 define terms and taxonomies on departmental computers 18 via an interface to a term and taxonomy management software package which runs on administration server 14, details of which will be described with respect to FIG. 2 below.

Suppose that user 17(*a*) represents a marketing organization and user 17(*b*) represents a support organization within a company that makes storage system products. Users 17(*a*) and 17(*b*) each compiles a list of terms to which data on centralized data storage system 16 is to be tagged. In the case of the marketing and support organizations, each organization will have terms in common; for example, each organization will have common terms for identical storage system products which the marketing organization will sell and for which the support organization will maintain a components list.

In some arrangements, users 17, having compiled their respective lists of terms, arrange their respective lists of terms into taxonomies which reflect the nature of the department's business. In constructing their respective taxonomies 2, common terms may have different relationships with respect to other terms in the taxonomies. An example of such taxonomies will be illustrated with respect to FIG. 1(*b*) below.

It should be understood that there can be more than two different organizations which submit term and taxonomic change requests to administration server 14. Because of the centralized nature of the administration of the cross-referencing database 15, there may be significant traffic which arrives at administration server 14 at a rate greater than which the messages 4 and 6 can be processed. In some arrangements, web interface 19 schedules the messages 4 and 6 requests in the order in which they were received (i.e. FIFO scheduling). In such cases, the addition of changes to a taxonomy may not be immediate, and web interface 19 would send a message 8 to the organizational computer 18(*a*) which sent message 4 when the change requested in message 4 has been added to the cross-referencing database 15.

It should be understood that common terms within each of the different organizations are described using identical terms. As mentioned above, it can be the case that each term will have synonyms which will identify the term in a search. Nevertheless, each term which identifies a subset of the data stored in centralized data storage system 16 is unique.

Further details about the cross-referencing database 15 will be explained with regard to FIGS. 2, 3 and 4 below.

Figure 2:
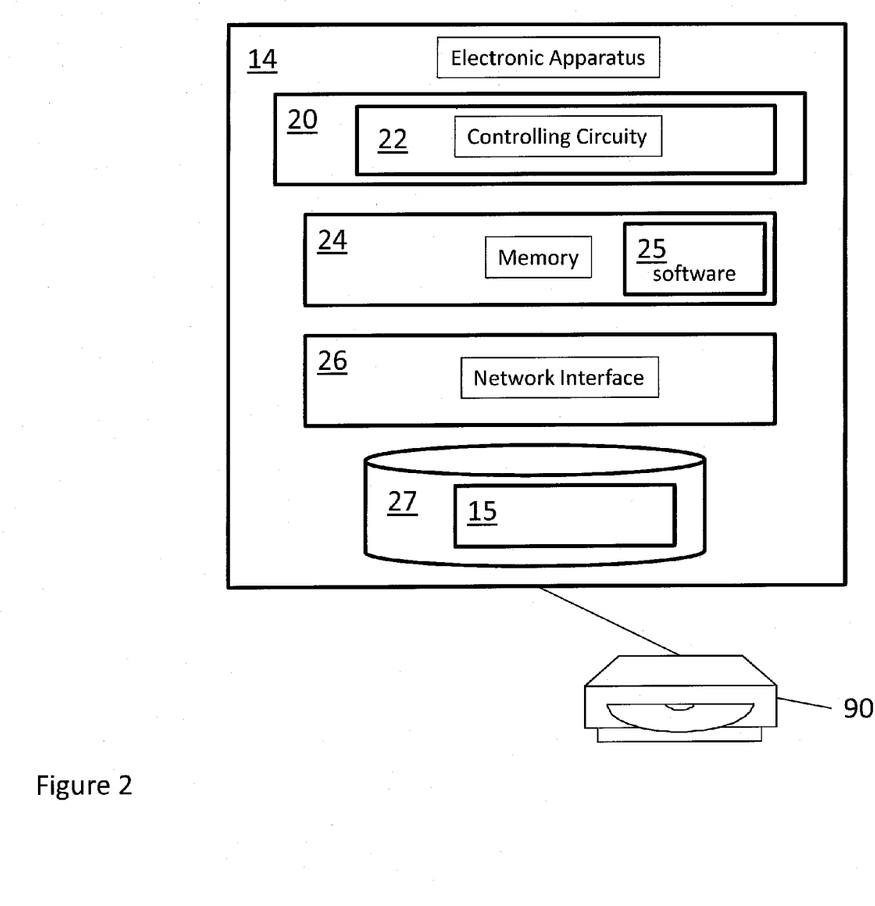
FIG. 2 is a schematic diagram of an electronic apparatus within the electronic environment illustrated in FIG. 1(a).

FIG. 2 shows further detail of administration server 14. Administration server 14 includes a controller 20 which in turn includes processor 22. Administration server 14 also includes memory 24, a network interface 26 and storage disk 27.

Memory 24 is configured to store a computer program 90 which is constructed and arranged to present data within multiple taxonomies via cross-referencing database 15. Memory 24 stores code 25 which provides instructions in processor 22 to run computer program 90. Memory 24 generally takes the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute the computer program 90 stored in memory 24.

Network interface 26 is constructed and arranged to send and receive data over communications medium 12. Specifically, network interface 26 is configured to receive message data from and send messages to departmental computers 18 over communications medium 12.

Storage disk 27 is constructed and arranged to store cross-referencing database 15 and term and taxonomy data within cross-referencing database 15.

Figure 3:
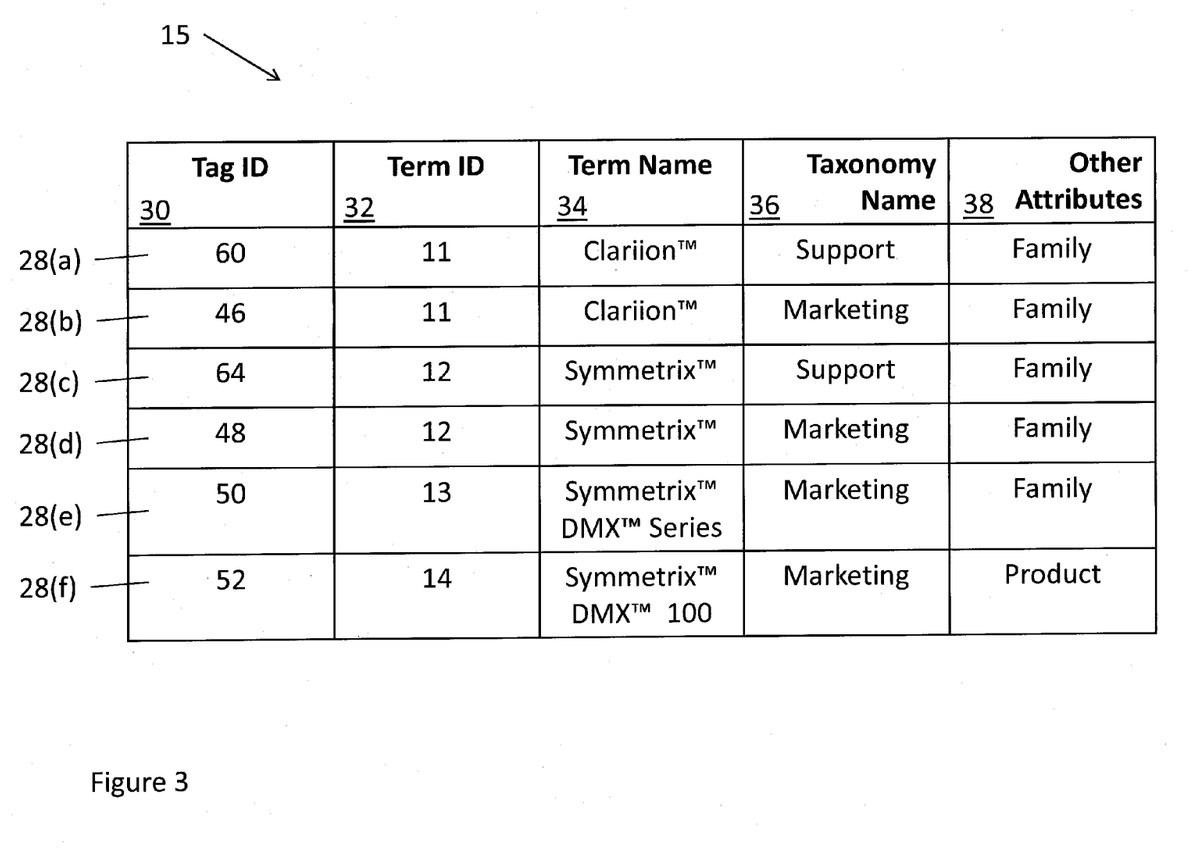
FIG. 3 is an illustration of a set of entries within a cross-referencing database which is stored on the electronic apparatus of FIG. 2.

FIG. 3 shows details of an example of a cross-referencing database 15 stored in storage disk 27. In this example, six entries 28(*a*), 28(*b*), 28(*c*), 28(*d*), 28(*e*) and 28(*f*) (entries 28) are shown, each entry showing five fields: Tag ID 30, Term ID 32, Term name 34, Taxonomy name 36 and Other Attributes 38.

To each unique Term Name 34 is assigned a unique Term ID value. In the example cross-referencing database 15, a Clariion™ family of storage systems has a unique Term ID value equal to 11. The term "Clariion" appears in two entries 28(*a*) and 28(*b*) within cross-referencing database 15. Here, the appearance in the two entries 28(*a*) and 28(*b*) signifies that the term "Clariion" exists within two taxonomies. These taxonomies have values of Taxonomy Name 36 equal to "Support" and "Marketing", respectively. To each of these values of Taxonomy Name 36 for this particular value of Term Name 34 are assigned unique values of Tag ID 30, in this case, 10 and 20, respectively.

Further, two more entries 28(*c*) and 28(*d*) in cross-referencing database 15 refer to another family of storage systems called Symmetrix™, having a Term Name value "Symmetrix" and having a Term ID value equal to 12. Each of the entries 28(*c*) and 28(*d*) correspond to the two taxonomies having Taxonomy Name values "Support" and "Marketing", respectively. Nevertheless, the respective Tag ID values for entries 28(*c*) and 28(*d*) take the values 30 and 40, which differ from those assigned to entries 28(*a*) and 28(*b*). That is, each entry in cross-referencing database 15 includes a unique Tag ID value.

The fact that each entry in cross-referencing database 15 includes a unique Tag ID value implies that a value of a Tag ID maps to a unique place within a particular taxonomy. In this way, the database allows one to see not only all the taxonomies to which a particular term is included, but all the relationships of the particular term to other terms within each taxonomy.

Mapping the place of a common term between different taxonomies is now straightforward. Suppose that a request 9 to perform a mapping between a first taxonomy and a second taxonomy is made by the remote computer user 11 at computer 13. The position of the term within the first taxonomy is sent in request 9 in the form of the unique Tag ID value. Processor 22 takes this unique Tag ID value and looks this value up in cross-referencing database 15 using a lookup operation. The result of the lookup operation is the location of the entry of cross-referencing database 15 which includes this unique Tag ID value. The entry which includes this Tag ID value also has a Term ID value, which processor 22 then stores into memory 24. Processor 22 then locates all entries in cross-referencing database 15 which have a value of Term ID equal to the value stored in memory 24. Within those located entries, the entry with the Taxonomy Name value equal to the name of the second taxonomy is selected. The Tag ID value of the selected entry reveals the location of the particular term within the second taxonomy.

The cross-referencing database 15 illustrated in FIG. 3 has two further entries 28(*e*) and 28(*f*) which illustrate further terms included within the Marketing taxonomy. As described above, these entries also have unique Tag ID values. Further, although the Term Name values contain the word "Symmetrix", the terms represent more specific products and are assigned different Term ID values.

In some arrangements, terms include metadata which further define the concepts embodied in the terms. For example, suppose that departmental computers 18 maintain a web site through which a remote computer user 11 searches on a computer 13 for information regarding product data defined by the terms. In one case, remote computer user 11 may be looking for information regarding Symmetrix™ storage systems, however, instead of typing "Symmetrix" into a search text box, the user types "symetrix." In such environments, metadata could include a list of synonyms defined by users 17. Other examples of metadata include a list of translations from other languages and a list of taxonomies to which the terms belong. Such metadata can be stored in additional fields of cross-referencing database 15.

It should be understood that the values of the Other Attributes field 38 in the cross-referencing database 15 illustrated in FIG. 3 can take on any sort of metadata associated with the terms. In the example illustrated in FIG. 3, an attribute concerning a Term Type which can take on values of "Family" or "Product", depending on whether the place the term occupies in a taxonomy has further dependents.

Figure 4:
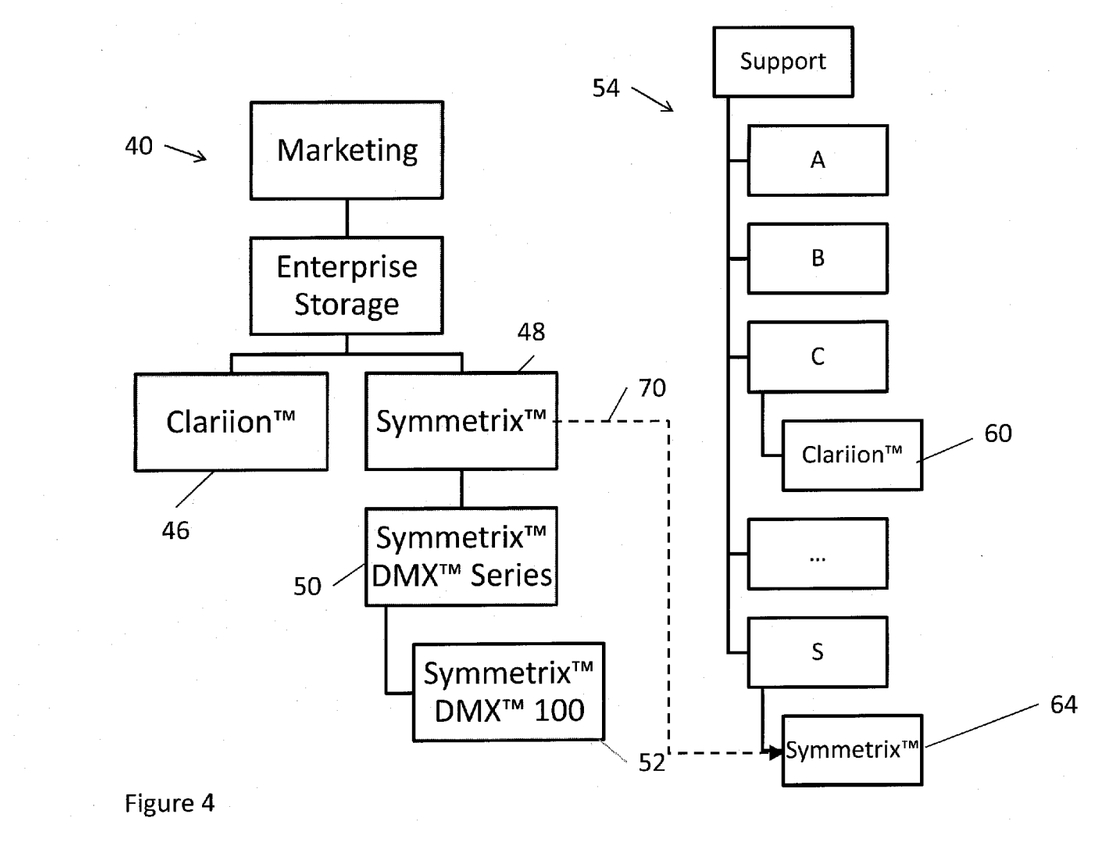
FIG. 4 is a schematic diagram of taxonomies represented in the cross-referencing database in FIG. 3.

FIG. 4 illustrates the two separate taxonomies 40 and 54 which result in the generation of and are logically equivalent to the entries 28 of cross-referencing database 15. As mentioned above, the Tag ID values provide the unique location of a term within a particular taxonomy. The mapping between taxonomies as described above is represented by the dashed arrow 70.

Figure 5:
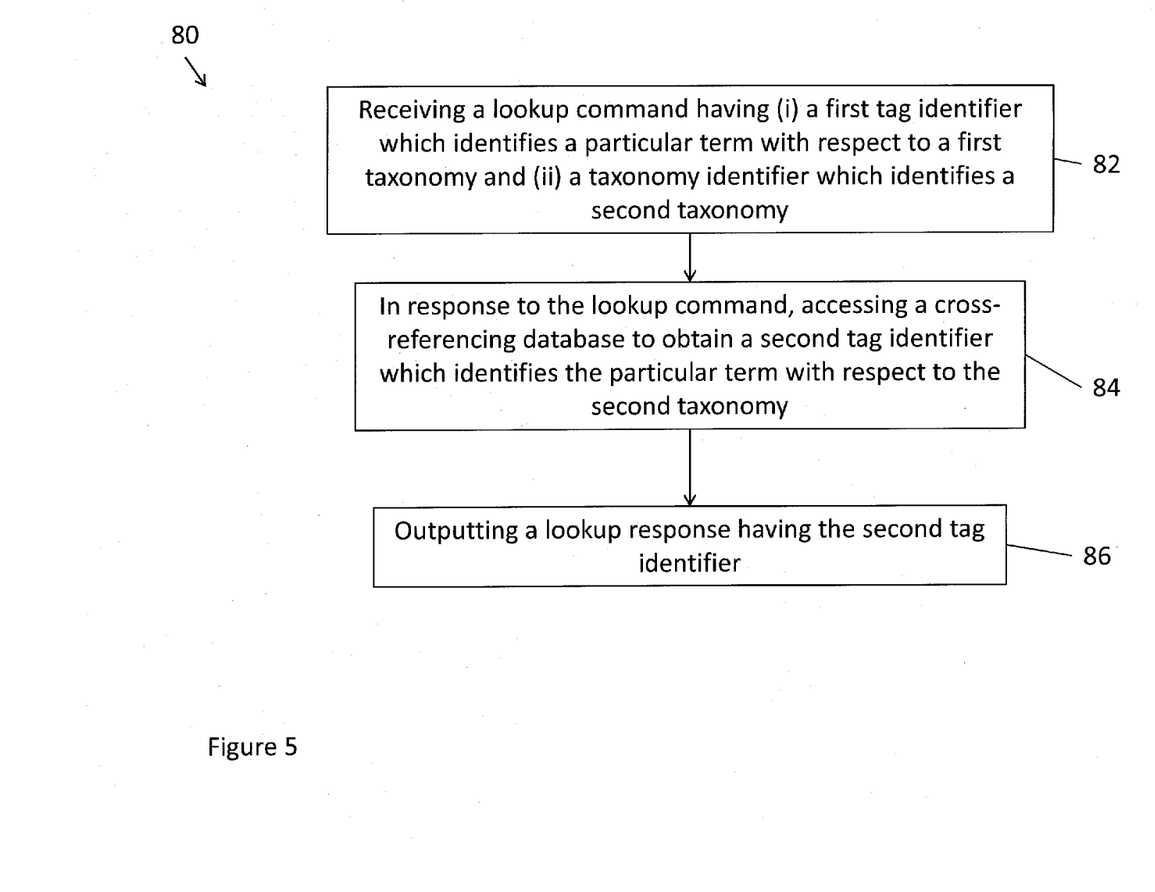
FIG. 5 is a flow chart illustrating a method for carrying out the improved techniques within the electronic environment illustrated in FIG. 1(a).

FIG. 5 illustrates a method 80 for carrying out the improved technique. In step 82, a first taxonomy and a second taxonomy is formed from a set of entities stored within the electronic apparatus, each entity of the set of entities identifying a portion of the data, each of the first taxonomy and the second taxonomy including entities of the set of entities, entities within the first taxonomy and the second taxonomy being arranged in hierarchal relationships with respect to other entities, the first taxonomy and the second taxonomy having at least one entity in common. In step 84, a cross-referencing database is generated which is constructed and arranged to map a particular entity of the at least one entity in common having a hierarchal relationship with respect to other entities within the first taxonomy to the same entity having another hierarchal relationship with respect to other entities within the second taxonomy, the cross-referencing database being stored within the electronic apparatus. In step 86, the hierarchal relationship of the particular entity with respect to other entities within the second taxonomy is acquired from the cross-referencing database and the hierarchal relationship of the particular entity with respect to other entities within the first taxonomy.

While various embodiments of the improved techniques have been particularly shown and described, it will be understood by those skilled in the art that various changes in form and details may be made therein without departing from the spirit and scope of the invention as defined by the appended claims.

For example, cross-referencing database 15 can take on any general form of a relational database which can map common terms in taxonomies to each other. For example, cross-referencing database 15 can be formatted according to IBM DB2, Microsoft SQL, Oracle DBMS, MySQL DBMS, etc.

Also, it should be understood that the examples used in the above descriptions in no way limit the improved techniques to those examples. For instance, the improved techniques are not limited to terms which describe products for sale and can pertain to any sets of taxonomies which include terms referencing any sort of concept. As an example, the improved techniques could refer to zoological systems, government organizations, or any other system in which multiple levels of descriptions of concepts are used.

Furthermore, it should be understood that some embodiments are directed to administration server 14 which cross-references terms across multiple taxonomies. Some embodiments are directed to administration server 14. Some embodiments are directed to a system which cross-references terms across multiple taxonomies. Some embodiments are directed to a process of presenting data. Also, some embodiments are directed to a computer program product which enables computer logic to perform the cross-referencing of terms across multiple taxonomies.

In some arrangements, administration server 14 is implemented by a set of processors or other types of control/processing circuitry running software. In such arrangements, the software instructions can be delivered to administration server 14 in the form of a computer program product (illustrated generally by code for computer program 90 stored within memory 24 in FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of cross-referencing terms across multiple taxonomies, the method comprising:
   receiving a lookup command having (i) a first tag identifier which identifies a particular term with respect to a first taxonomy and (ii) a taxonomy identifier which identifies a second taxonomy;
   in response to the lookup command, accessing a cross-referencing database to obtain a second tag identifier which identifies the particular term with respect to the second taxonomy; and
   outputting a lookup response having the second tag identifier.

2. A method according to claim 1, wherein the cross-referencing database includes a set of entries;
   wherein each entry of the set of entries of the cross-referencing database includes a term identifier, a tag identifier and a taxonomy identifier; and
   wherein accessing the cross-referencing database to obtain the second tag identifier includes:
      based on the first tag identifier, obtaining a term identifier from a first entry of the set of entries of the cross-referencing database, and
      based on the term identifier from the first entry and the taxonomy identifier, obtaining the second tag identifier from a second entry of the set of entries of the cross-referencing database.

3. A method according to claim 2, wherein the tag identifiers of different entries of the set of entries of the cross-referencing database are different;
   wherein obtaining a term identifier from a first entry of the set of entries of the cross-referencing database includes:
      locating the unique entry of the set of entries which has the first tag identifier, and
      storing the term identifier of the unique entry into a memory location within the electronic apparatus; and
   wherein obtaining the second tag identifier from a second entry of the set of entries of the cross-referencing database includes:
      locating another entry of the set of entries which has the term identifier stored in the location in the memory location and the taxonomy identifier, and
      acquiring the tag identifier of the another entry.

4. A method according to claim 3, wherein identifying a particular term with respect to a taxonomy includes:
   locating a hierarchal position of the taxonomy at which the particular term is situated with respect to other terms; and
   wherein the method further comprises:
      prior to receiving the lookup command, receiving a first message which includes hierarchal positions added to the first taxonomy and a second message which includes hierarchal positions added to the second taxonomy, and
      generating an entry of the set of entries for each hierarchal position added to each of the first taxonomy and the second taxonomy.

5. A method according to claim 4, wherein each term is associated with metadata, the first message and the second message each including metadata associated with each term; and
   wherein generating an entry of the set of entries includes: adding values of fields of the metadata to the entry.

6. A method according to claim 5,
   wherein the metadata includes a list of synonyms, each synonym of the list of synonyms being a valid representation of the term identifier;
   wherein storing the term identifier of the unique entry into a memory location within the electronic apparatus includes:
      storing synonyms of the list of synonyms in additional fields of the cross-referencing database; and
   wherein locating the other entry of the set of entries which has the term identifier stored in the location in the memory location includes:
      performing a lookup operation on the synonyms stored in the additional fields of the cross-referencing database when the term identifier is not identified with respect to the second taxonomy.

7. A method according to claim 4, wherein receiving a lookup command includes:
   receiving, from a remote computer having an output device, a third message which includes the particular term and a taxonomy identifier which identifies the first taxonomy; and
   wherein outputting a lookup response having the second tag identifier includes:
      sending, to the remote computer, a fourth message which includes the second tag identifier, the remote computer constructed and arranged to output to the output device a graphical representation of the second taxonomy from the second tag identifier.

8. A method according to claim 7, wherein the method further comprises:
   prior to sending the fourth message to the remote computer, placing the instructions included in the third message into a queue, the queue including other lookup commands received from other remote computers before receipt of the third message;
   carrying out the lookup command included in the third message when the other lookup commands have been carried out.

9. A method according to claim 1,
   wherein the first taxonomy defines a hierarchy of product categories of a first organization,
   wherein the second taxonomy defines a hierarchy of product categories of a second organization;
   wherein the particular term includes a name of a product category in the first taxonomy; and
   wherein accessing the cross-referencing database to obtain the second tag identifier includes cross-referencing, in the cross-referencing database, the name of the product category in the first taxonomy to a name of the same product category in the second taxonomy.

10. An electronic system constructed and arranged to cross-reference terms across multiple taxonomies, comprising:
    an electronic apparatus which includes:
       a network interface coupled to a network;
       a memory; and
       a controller which includes controlling circuitry, the controlling circuitry constructed and arranged to:
          receive a lookup command having (i) a first tag identifier which identifies a particular term with respect to a first taxonomy and (ii) a taxonomy identifier which identifies a second taxonomy;
          in response to the lookup command, access a cross-referencing database to obtain a second tag identifier which identifies the particular term with respect to the second taxonomy; and
          output a lookup response having the second tag identifier.

11. A system according to claim 10, wherein the cross-referencing database includes a set of entries;
    wherein each entry of the set of entries of the cross-referencing database includes a term identifier, a tag identifier and a taxonomy identifier; and
    wherein accessing the cross-referencing database to obtain the second tag identifier includes:
       based on the first tag identifier, obtaining a term identifier from a first entry of the set of entries of the cross-referencing database, and
       based on the term identifier from the first entry and the taxonomy identifier, obtaining the second tag identifier from a second entry of the set of entries of the cross-referencing database.

12. A system according to claim 11, wherein the tag identifiers of different entries of the set of entries of the cross-referencing database are different;
    wherein obtaining a term identifier from a first entry of the set of entries of the cross-referencing database includes:
       locating the unique entry of the set of entries which has the value of the first tag identifier, and
       storing the term identifier of the unique entry into a memory location within the electronic apparatus; and
    wherein obtaining the second tag identifier from a second entry of the set of entries of the cross-referencing database includes:
       locating another entry of the set of entries which has the term identifier stored in the location in the memory location and the taxonomy identifier, and
       acquiring the tag identifier of the another entry.

13. A system according to claim 12, wherein identifying a particular term with respect to a taxonomy includes:
    locating a hierarchal position of the taxonomy at which the particular term is situated with respect to other terms; and
    wherein the controlling circuitry is further constructed and arranged to:
       prior to receiving the lookup command, receive a first message which includes hierarchal positions added to the first taxonomy and a second message which includes hierarchal positions added to the second taxonomy, and generate an entry of the set of entries for each hierarchal position added to each of the first taxonomy and the second taxonomy.

14. A system according to claim 13, wherein each term is associated with metadata, the first message and the second message each including metadata associated with each term; and wherein generating an entry of the set of entries includes: adding values of fields of the metadata to the entry.

15. A system according to claim 13, wherein receiving a lookup command includes:

receiving, from a remote computer having an output device, a third message which includes the particular term and a taxonomy identifier which identifies the first taxonomy; and wherein outputting a lookup response having the second tag identifier includes:

sending, to the remote computer, a fourth message which includes the second tag identifier, the remote computer constructed and arranged to output to the output device a graphical representation of the second taxonomy from the second tag identifier.

16. A method according to claim 15, wherein the controlling circuitry is further constructed and arranged to:

prior to sending the fourth message to the remote computer, place the instructions included in the third message into a queue, the queue including other lookup commands received from other remote computers before receipt of the third message;

carry out the lookup command included in the third message when the other lookup commands have been carried out.

17. A computer program product having a non-transitory computer readable storage medium which stores a set of instructions to cross-reference terms across multiple taxonomies, the set of instructions, when carried out by a computerized device, causing the computerized device to:

receive a lookup command having (i) a first tag identifier which identifies a particular term with respect to a first taxonomy and (ii) a taxonomy identifier which identifies a second taxonomy;

in response to the lookup command, access a cross-referencing database to obtain a second tag identifier which identifies the particular term with respect to the second taxonomy; and output a lookup response having the second tag identifier.

18. A computer program product according to claim 17, wherein the cross-referencing database includes a set of entries;

wherein each entry of the set of entries of the cross-referencing database includes a term identifier, a tag identifier and a taxonomy identifier; and wherein accessing the cross-referencing database to obtain the second tag identifier includes:

based on the first tag identifier, obtaining a term identifier from a first entry of the set of entries of the cross-referencing database, and based on the term identifier from the first entry and the taxonomy identifier, obtaining the second tag identifier from a second entry of the set of entries of the cross-referencing database.

19. A computer program product according to claim 18, wherein the tag identifiers of different entries of the set of entries of the cross-referencing database are different;

wherein obtaining a term identifier from a first entry of the set of entries of the cross-referencing database includes:

locating the unique entry of the set of entries which has the value of the first tag identifier, and storing the term identifier of the unique entry into a memory location within the electronic apparatus; and wherein obtaining the second tag identifier from a second entry of the set of entries of the cross-referencing database includes:

locating another entry of the set of entries which has the term identifier stored in the location in the memory location and the taxonomy identifier, and acquiring the tag identifier of the another entry.

20. A computer program product according to claim 19, wherein identifying a particular term with respect to a taxonomy includes:

locating a hierarchal position of the taxonomy at which the particular term is situated with respect to other terms; and wherein the set of instructions further causes the computerized device to:

prior to receiving the lookup command, receive a first message which includes hierarchal positions added to the first taxonomy and a second message which includes hierarchal positions added to the second taxonomy, and generate an entry of the set of entries for each hierarchal position added to each of the first taxonomy and the second taxonomy.

21. A computer program product according to claim 20, wherein each term is associated with metadata, the first message and the second message each including metadata associated with each term; and wherein generating an entry of the set of entries includes: adding values of fields of the metadata to the entry.

22. A computer program product according to claim 20, wherein receiving a lookup command includes:

receiving, from a remote computer having an output device, a third message which includes the particular term and a taxonomy identifier which identifies the first taxonomy; and wherein outputting a lookup response having the second tag identifier includes:

sending, to the remote computer, a fourth message which includes the second tag identifier, the remote computer constructed and arranged to output to the output device a graphical representation of the second taxonomy from the second tag identifier.

* * * * *